United States Patent [19]
Tsygankov et al.

[11] 3,972,736
[45] Aug. 3, 1976

[54] STORAGE BATTERY

[76] Inventors: Mikhail Stepanovich Tsygankov, ulitsa Ordzhonikidze 14, kv. 24; Nina Alexandrovna Bitjutskaya, ulitsa Stepana Razina, 36, kv. 18; Vera Nikonorovna Fateeva, ulitsa Ordzhonikidze, 14, kv. 28; Valery Nikolaevich Kosholkin, Novo-Astrakhanskoe shosse, 43, kv. 47; Boris Dmitrievich Karev, ulitsa Millerovskaya 73a, kv. 4; Nikolai Alexeevich Kudinov, ulitsa Chapaeva, 128; Mars Mikhailovich Kholkin, ulitsa Chapaeva, 29, kv. 28; Nikolai Nikiforovich Moiseev, prospekt Kirova, 15, kv. 4; Oleg Georgievich Malandin, ulitsa Sovetskaya, 23, kv. 23, all of Saratov, U.S.S.R.

[22] Filed: Feb. 22, 1974

[21] Appl. No.: 444,982

[30] Foreign Application Priority Data
Feb. 26, 1973 U.S.S.R. .............................. 1887424

[52] U.S. Cl. ............................ 136/163; 136/166
[51] Int. Cl.² ...................................... H01M 2/02
[58] Field of Search ........................... 136/163, 166

[56] References Cited
UNITED STATES PATENTS

| | | | |
|---|---|---|---|
| 1,313,513 | 8/1919 | Bedell | 136/163 |
| 1,322,102 | 11/1919 | Gardiner | 136/163 |
| 1,983,219 | 12/1934 | Dunzweiler | 136/166 |
| 2,708,213 | 5/1955 | Koren | 136/166 |
| 3,416,969 | 12/1968 | Halsall | 136/166 |

FOREIGN PATENTS OR APPLICATIONS

| | | | |
|---|---|---|---|
| 682,927 | 10/1939 | Germany | 136/179 |
| 753,745 | 8/1956 | United Kingdom | 136/163 |

*Primary Examiner*—Donald L. Walton
*Attorney, Agent, or Firm*—Haseltine, Lake & Waters

[57] ABSTRACT

A storage battery whose container accommodates series-connected cells whose jars are filled with electrolyte and contain plate groups assembled from plates with the aid of elements which fasten the terminal posts to the plates while the internal surfaces of two opposite walls of the jar facing the surfaces of the end plates of the plate group are provided with vertical ribs ensuring circulation of electrolyte in the electrolyte layer around the plate group, each cell having a dielectric plate which rests freely on the elements fastening the terminal posts to the plates.

2 Claims, 4 Drawing Figures

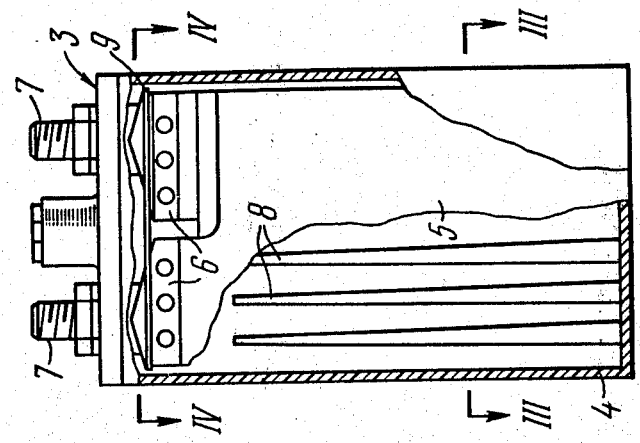
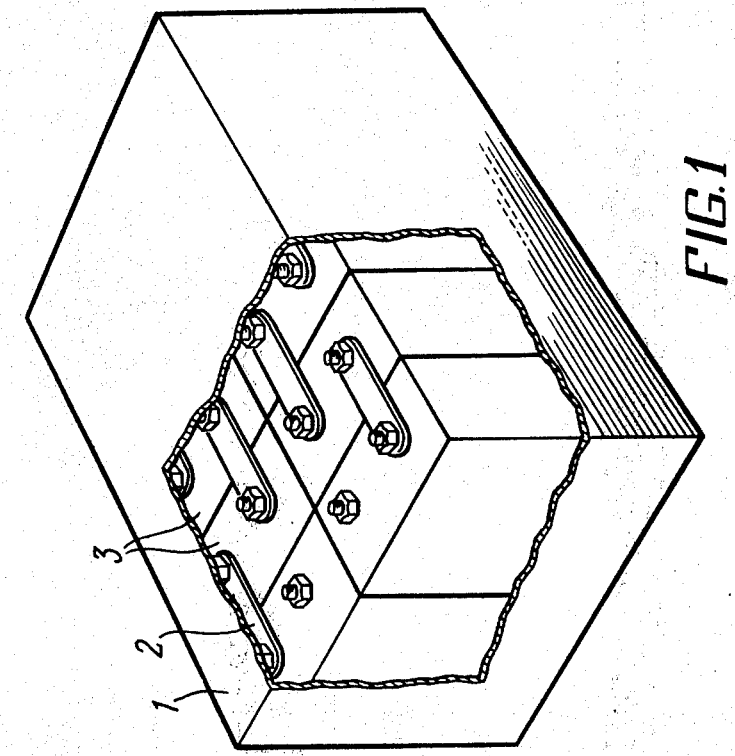

STORAGE BATTERY

The present invention relates to storage batteries and is intended for use in transport facilities in the capacity of a standby source of electric power and for non-assisted starting of engines.

The storage battery according to the invention can be used, for example, in aircraft, e.g. airplanes and helicopters.

While providing a standby source of electric power for aircraft material due consideration should be given to the factors related to improving the battery performance at starter duties and preventing the throwout of electrolyte from the cells under various operating conditions, i.e., when the storage battery operating at a buffer duty is subjected to such physical effects as vibrations, impacts, etc.

In the known storage batteries the plate groups fill completely the internal cross-section of the cell jar without any clearances between the jar walls and the surfaces of the end plates.

The cells of such batteries are provided with a structural element in the form of a strap with a prismatic boss fixed rigidly in the gas space on the cell terminal posts.

The main disadvantages of the known storage batteries reside in inferior circulation of electrolyte in the cells and the possibility of electrolyte throwout caused by physical effects on the storage battery.

When the storage battery operates at a buffer duty and is charged, the electrolyte is forced by gassing into the upper part of the cell, i.e., into the gas space. As the charging of the battery ceases, dripping of electrolyte back into the lower part of the cells is greatly hampered by the absence of the clearances between the end plates of the plate group and the adjoining internal walls of the cell jar. The clearances between the negative and positive plates are filled by separators which is also detrimental to circulation of electrolyte. Poor circulation of electrolyte in the cell may result, on the one hand, in drying of the lower part of the plate group and in increased internal resistance of the cell which impairs battery performance at heavy discharge ratings.

On the other hand, the raised electrolyte level increases the probability of its throwing out from the cells during physical effects on the storage battery when the latter is being charged at a buffer duty.

An object of the present invention resides in eliminating the aforesaid disadvantages.

The main object of the invention is to provide a storage battery with a considerably facilitated circulation of electrolyte in its cells, wherein provision is made to prevent the throwout of electrolyte in case of physical effects on the battery operating at a buffer duty on an aircraft.

This object is accomplished by providing a battery comprising a container accommodating cells interconnected in series by intercell connectors, the cell jars containing plate groups assembled with the aid of elements which fasten the terminal posts to the plates, wherein, according to the invention, each battery cell is provided with vertical ribs on the internal surface of two opposite walls facing the surfaces of the end plates of the plate group, said ribs ensuring circulation of electrolyte in the electrolyte layer around the plate groups and wherein each cell is provided with a dielectric plate freely resting in the cell jar on the elements which fasten the terminal posts to the plates.

It is practicable that the relation of the distance between any two adjacent vertical ribs to the width of the plate be selected from 0.15 to 0.25 and the relation of the rib width to the distance between the two adjacent ribs be from 0.10 to 0.25 in which case it is practicable that the relation of the area of the dielectric plate to the cross-sectional area of the cell limited by the internal dimensions of the jar and lying in the same plane as the plate should range from 0.85 to 0.95.

The storage battery according to the invention is guaranteed against throwout of electrolyte under any service conditions and has a better performance at starter duties.

Now the invention will be described in detail by way of example with reference to the accompanying drawings, in which:

FIG. 1 shows the storage battery according to the invention;

FIG. 2 shows one of the battery cells;

Figure 3:
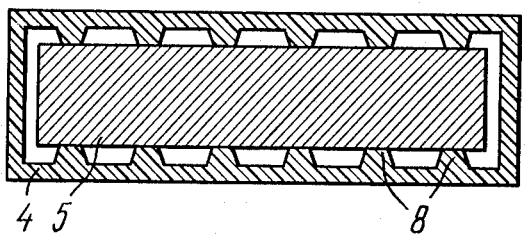
FIG. 3 is a section taken along line III—III in FIG. 2.

The storage battery (FIG. 1) comprises a container with cells 3 connected in series by intercell connectors 2. The jar 4 (FIG. 2) of each cell 3 filled with electrolyte accommodates a plate group 5 assembled from plates with the aid of elements 6 which fasten terminal posts 7 to the plates. Each jar 4 of the cell 3 is provided with vertical ribs 8 on the internal surface of two opposite walls facing the surfaces of the end plates of the plate group 5 and each cell 3 has a dielectric plate 9 placed freely on the fastening elements 6 of the terminal posts 7.

While the storage battery operating at a buffer duty on the aircraft is being charged, the electrolyte is forced by gassing into the upper part of the cells. This causes partial drying of the lower part of the plate group 5 thus increasing the internal resistance of the storage battery and impairing its starter characteristics. The use of vertical ribs 8 on the internal walls of the jar 4 ensures a continuous electrolyte layer around the plate group 5 (FIG. 3) and free circulation of electrolyte. This improves wetting of the lower part of the plate groups 5 thus raising the starting characteristics of the storage battery and lowering the electrolyte level in the cells in the course of charging. A lower level of electrolyte reduces the possibility of it being thrown out from the cell 3 when the battery is subjected to physical effects at a buffer duty.

To preserve the electrolyte layer around the plate group 5 within the entire service life of the storage battery, it is necessary to take into account the mechanical strength of battery plates while designing the vertical ribs 8 (FIGS. 2 and 3).

Factory tests have shown that the relation of the distance between any two adjacent ribs 8 to the plate width must be within 0.15–0.25. If this relation is higher than 0.25, this may lead to bending of the end plates of the plate group 5 and reduce the effect produced by the use of the vertical ribs 8.

The relation smaller than 0.15 is impracticable since it involves an increase in the number of vertical ribs 8.

The relation of the width of the vertical rib 8 to the distance between the two adjacent vertical ribs 8 should be from 0.15 to 0.25. A relation smaller than 0.15 is impracticable since it may lead to breaking of the end plates of the plate group 5. In case of the relation greater than 0.25 the electrolyte layer will be decreased around the plate group 5.

The joint application of the vertical ribs 8 (FIG. 2) in the jar and of the dielectric plate 9 freely resting on the fastening elements 6 of the terminal posts 7 in the cell 3 (FIG. 2) excludes completely the throwout of electrolyte from the cells 3.

Figure 4:
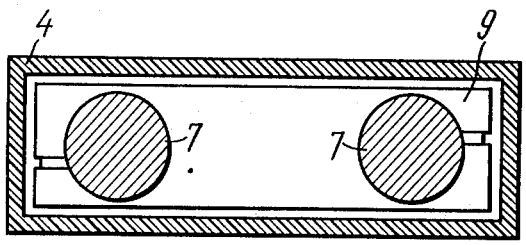
FIG. 4 is a section taken along line IV—IV in FIG. 2.

The advantages of such an arrangement reside in the simplicity of manufacture of the dielectric plate 9 which can be made, say, by punching it from sheet material and in the simplicity of its installation in the cell 3 since the plate must not be fixed in any definite position. To achieve maximum effect in the prevention of electrolyte throwout from the cell 3 by means of the dielectric plate 9 (FIG. 4), the relation of its area to the cross-sectional area of the cell 3 limited by the internal dimensions of the jar 4 should be from 0.85 to 0.95. If this relation is lower than 0.85, the efficiency of the dielectric plate 9 drops while at relations higher than 0.95 it becomes difficult to install the dielectric plate 9 into the cell 3 during assembly.

We claim:

1. A storage battery comprising a container; cells installed in said container and series-connected by intercell connectors; jars with electrolyte of said cells containing plate groups assembled from plates with the aid of elements which fasten terminal posts to the plates; vertical ribs in each of said battery cells located on the internal surfaces of two opposite walls facing the surfaces of the end plates of said plate group and ensuring circulation of electrolyte in the electrolyte layer around said plate groups; a dielectric plate located in said cell and resting freely on said elements fastening the terminal posts to the electrodes, said plate being an imperforate sheet material provided with openings through which the terminal post extend.

2. A storage battery according to claim 1 wherein the relation of the distance between any two adjacent vertical ribs to the width of the plate is from 0.15 to 0.25 with the relation of the width of said vertical rib to the distance between the adjacent vertical ribs being from 0.10 to 0.25 while the relation of the area of said dielectric plate to the cross-sectional area of said cell limited by the internal dimensions of the jar and lying in the same plane as said dielectric plate is from 0.85 to 0.95.

* * * * *